March 11, 1969  E. C. WILLIAMS  3,432,079
PARTICULATE MATERIALS DISPENSER
Filed Feb. 27, 1967

INVENTOR
EDWARD C. WILLIAMS
BY
*Fetherstonhaugh & Co.*
ATTORNEYS

March 11, 1969   E. C. WILLIAMS   3,432,079
PARTICULATE MATERIALS DISPENSER
Filed Feb. 27, 1967   Sheet 2 of 2
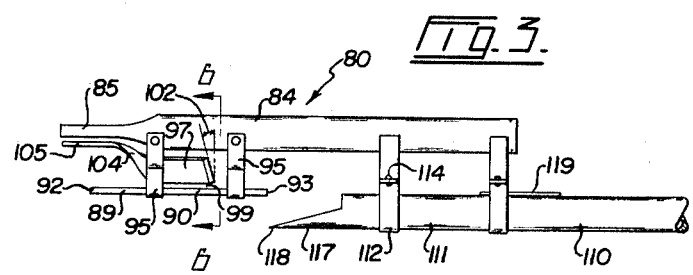
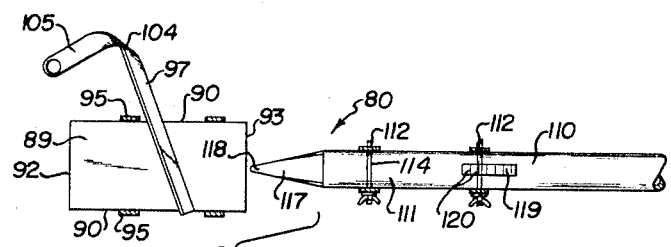
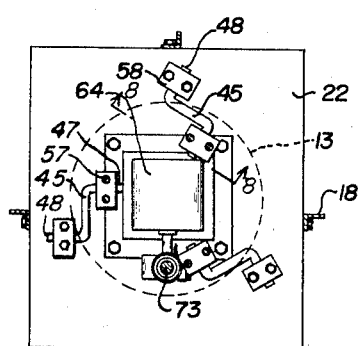
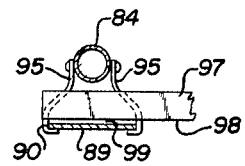
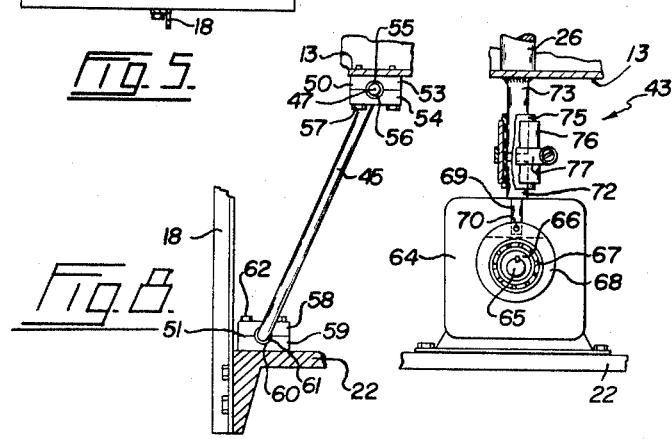
INVENTOR
EDWARD C. WILLIAMS
BY
ATTORNEYS United States Patent Office 3,432,079
Patented Mar. 11, 1969

3,432,079
PARTICULATE MATERIALS DISPENSER
Edward C. Williams, 1378 Fernwood Crescent,
North Vancouver, British Columbia, Canada
Filed Feb. 27, 1967, Ser. No. 618,733
U.S. Cl. 222—199         19 Claims
Int. Cl. B65g 65/38, 27/18

ABSTRACT OF THE DISCLOSURE

A dispenser for particulate materials, such as granular and powdery materials, grains and the like, having a vertical spiral ramp conveyor subjected to vertical and rotational oscillatory movement, and a discharge chute at the upper end of the conveyor positioned to receive particulate material therefrom and subjected to longitudinal reciprocatory movement so that the material can be discharged at predetermined rates regardless of the nature of the granular and powdery materials.

Background of the invention

This invention relates to apparatus for dispensing particulate materials, and particularly fine powders that may be difficult to control, such as diatomaceous earth.

Apparatus for feeding or dispensing fine particulate materials are known, but the problem is to obtain a constant discharge of the materials, and to be able to adjust this to different rates as required. The prior devices for this purpose are complicated and expensive to produce.

Summary of the invention

A dispenser for particulate materials including a vertical spiral ramp conveyor mounted for vertical and rotational oscillatory movement, and having novel means for discharging particulate material from the upper end thereof at a predetermined rate of flow. This discharge apparatus includes a discharge chute at the upper end of the ramp conveyor extending away therefrom and having an inner end positioned to receive particulate material from the ramp conveyor. This chute is subjected to longitudinal reciprocatory movement to help the movement of the particulate material therealong in a constant and regulated fashion. Suitable means is provided for regulating the flow of material from the apparatus so that the flow can be adjusted within a range of from a few ounces to a few pounds per hour.

Brief description of the drawings

FIGURE 3 is an enlarged fragmentary section taken on the line 3—3 of FIGURE 2, FIGURE 4 is a horizontal section taken on the line 4—4 of FIGURE 1, FIGURE 5 is a horizontal section taken on the line 5—5 of FIGURE 1, FIGURE 6 is a fragmentary section taken on the line 6—6 of FIGURE 1, FIGURE 7 is an enlarged view, partly in section, of part of the power mechanism for imparting movement to the ramp conveyor and the elements associated therewith, and FIGURE 8 is an enlarged sectional view taken on the line 8—8 of FIGURE 5.

Description of the preferred embodiment

Figure 1:
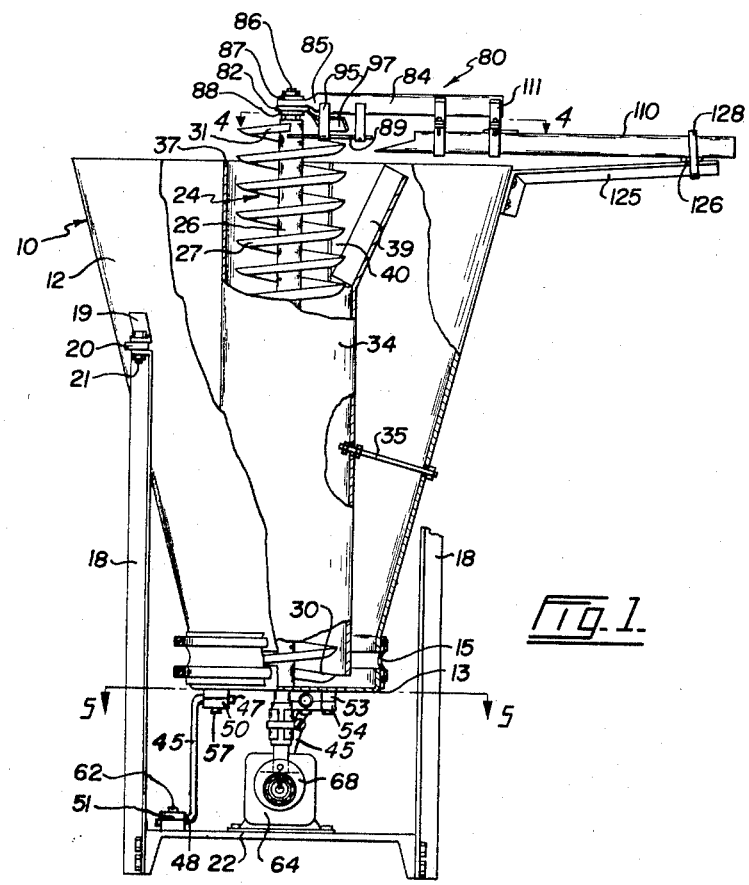
FIGURE 1 is a side elevation of a dispenser according to this invention, with parts thereof broken away.

A particulate materials dispenser 10 in accordance with the present invention includes a hopper 12 tapering down to a relatively small bottom 13, which is movable relative to the hopper and is connected thereto by a flexible sleeve 15. The hopper is resiliently supported in any convenient manner, such as by means of a plurality of legs 18. A bracket 19 is fixedly connected to the hopper immediately above each leg 18, and a resilient pad 20 is located between adjacent ends of each of these brackets and the adjacent leg end, said bracket, pad and leg being secured together by means of a rubber bushed bolt 21. With this arrangement, the hopper is resiliently supported by legs 18. A base 22 is secured to these legs 18 adjacent the lower ends thereof, as clearly shown in FIGURE 1.

A vertical spiral ramp conveyor generally designated by the numeral 24 is mounted on base 13 and projects upwardly therefrom in hopper 12 centrally thereof. The conveyor consists of a central column 26 having a spiral ramp or passageway 27 wound therearound from the bottom 13 of the hopper upwardly to near the upper end of column 26. Passageway 27 has a spiral bottom 29 that inclines inwardly towards column 26 in a cross sectional or radial direction. Ramp conveyor 24 has an entrance 30 at its lower end at bottom 13 through which particulate material can enter passageway 27. The conveyor also has an outlet 31 at its upper end through which the particulate material is discharged from the conveyor.

A tubular shield or sleeve 34 surounds but is spaced from the spiral passageway 27 of conveyor 24. This sleeve is supported in any suitable manner within hopper 12. In this example, a plurality of radiating bolts 35 are each connected at one end to sleeve 34 and at its opposite end to hopper 12. Sleeve 34 terminates at its lower end above bottom 13 and entrance 30 of the conveyor. The upper end of the sleeve terminates at 37 near, but preferably spaced below, the upper end of passageway 27. An inclined baffle 39 is connected to sleeve 34 below its upper end 37 and at one side thereof. Although this baffle may be a separate piece, it is preferably a piece cut from sleeve 34 and bent outwardly therefrom, as shown. Baffle 39 is inclined upwardly and outwardly from the sleeve, and at its lower end communicates with the interior of the sleeve through an opening 40 formed in said sleeve.

Rapid oscillatory and vibratory motion is imparted to conveyor 24 at the lower end thereof, preferably through bottom 13. This motion imparting mechanism 43 includes a plurality of inclined, rigid links 45 arranged generally in a circle beneath bottom 13. There are preferably three of these links, and they are all inclined in the same direction. Each link 45 has substantially horizontal pins 47 and 48 projecting laterally therefrom in opposite directions into upper and lower sets of pillow blocks 50 and 51. Each upper set 50 includes pillow blocks 53 and 54 having opposed grooves therein to form a channel 55 for receiving the end 47 of one of the links, said end having a resilient sleeve 56 fitted thereover. These blocks are secured together and to the lower surface of bottom 13 in any convenient manner, such as by bolts 57. Each set 51 is formed in the same manner as set 50, and includes pillow blocks 58 and 59 with a channel 60 therebetween for receiving one of the pins 48 with a resilient sleeve 61 fitting over it, said blocks being secured together and to base 22 by bolts 62. Although the sets of upper and lower blocks 50 and 51 grip the adjacent pins of links 45, the resiliency of sleeves 56 and 61 permit said link pins to rotate to a limited degree when links 45 are swung back and forth on their lower pins 48.

In this embodiment of the invention, the oscillatory and vibratory motion is imparted to hopper bottom 13 and conveyor 24 in a very simple manner. An electric motor 64 is mounted on base 22 and has a drive shaft 65 projecting therefrom. An eccentric cam 66 is mounted on and keyed to this shaft to rotate therewith, see FIGURE 7.

This cam has a very small throw, something of the order of 0.025 inch. A bearing race 67 surrounds and is carried by cam 66, and a suitable frame 68 is mounted on this race. A threaded rod 69 is swingably connected at its lower end to frame 68 by a pin 70, extends upwardly from this frame, and is threaded into a cylindrical block 72. This block is located immediately beneath but slightly spaced from the lower end of a rod 73 which is connected at its upper end to the lower surface of hopper bottom 13. A resilient bushing 75 fits over block 72 and rod 73, which are of the same diameter, and is clamped against these elements by a split sleeve 76 and a clamping ring 77. With this arrangement, when motor 64 is in operation, eccentric cam 66 imparts a very rapid vertical vibration of low amplitude to frame 68 and, consequently, through rod 69, block 72, sleeve 75 and rod 73, to hopper bottom 13 and the spiral conveyor 24. The resiliency of sleeve 75 allows block 72 to rock slightly therein during this action.

When in use, the particulate material to be dispensed, such as diatomaceous earth, is placed in hopper 12. When motor 64 is in operation, bottom 13 and conveyor 24 are subjected to rapid oscillatory and vibratory motion. Eccentric cam 66 imparts a substantially vertical vibration to the hopper bottom, and as this is connected to base 22 through links 45, this bottom and conveyor 24 are subjected to both oscillatory and vibratory motion. This causes the material to travel through entrance 30 of spiral passageway 27, and to move upwardly along said passage to outlet 31. The movement of particulate material along a spiral ramp under this type of action is well known, and does not require any description herein.

Discharge apparatus generally indicated by the numeral 80 is located at the top of hopper 12 and positioned to receive particulate material from ramp conveyor outlet 31. In this example, apparatus 80 includes a bracket 82 rigidly secured to the upper end of conveyor column 26 and radiating outwardly therefrom in a substantially horizontal plane. A supporting arm 84 is connected at its inner end 85 to bracket 82 and extends substantially normal thereto so that it is in effect arranged substantially tangentially to spiral passageway 27 of conveyor 24, and above outlet 31 thereof. In this example, arm 84 is in the form of a tube and has its end 85 flattened and secured to bracket 82 by means of a rubber bushed bolt 86 and separated therefrom by rubber washers 87 and 88.

A discharge chute 89 is suspended from and underlies arm 84, this chute preferably being in the form of a flat plate, as shown, which is open at its opposite edges 90. Chute or plate 89 has an inner end 92 which is positioned to receive particulate material as it passes through outlet 31 of the ramp conveyor, and an outer or discharge end 93. Suitable brackets 95 are secured to arm 84 and hang downwardly therefrom, and are connected to the side edges of chute 89 to support the latter in its proper position relative to the conveyor outlet. Although not absolutely necessary, it is preferable to provide a vertical blade 97 above and extending transversely of chute 89. Blade 97 is mounted with its lower edge 98 spaced above chute 89, see FIGURE 6, to provide a passage 99 therebetween.

Figure 2:
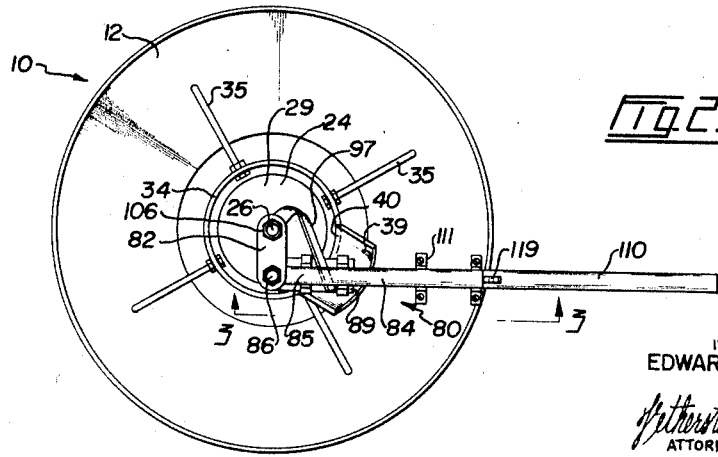
FIGURE 2 is a plan view of the dispenser.

Although blade 97 may be fixedly or adjustably mounted on and suspended from arm 84, it is preferable to mount it on the upper end of conveyor column 26. In this example, leveling blade 97 is made of spring steel, is inclined out of the vertical plane towards chute end 92, as indicated by angle 102 in FIGURE 3, and is longitudinally inclined transversely of chute 89, as clearly shown in FIGURE 2. Blade 97 extends outwardly away from chute 89, and is twisted at 104 into an end 105 which lies in a substantially horizontal plane, said blade being connected to the upper end of conveyor column 26 by a nut 106. Blade end 105 radiates from the column, and blade 97 extends substantially at right angles to said end and angularly across chute 89. With this arrangement, the blade is subjected to the rapid oscillatory motion of ramp conveyor 24 so that the outer end of the blade very rapidly swings back and forth over chute 89 substantially longitudinally of the latter. The springiness of the blades cause it to vibrate relative to chute 89 substantially longitudinally thereof.

When conveyor 24 is subjected to the oscillatory and vibratory motion, the outer end of bracket 82 is vibrated and swung rapidly back and forth through an arc. This imparts vibratory motion to arm 84 and plate 89 in a direction longitudinally of the latter. In other words, the plate is subjected to a longitudinal shaking and a substantially vertical vibratory action. This causes particulate material which emerges through conveyor outlet 31 to travel along plate 89 towards the discharge end 93 thereof. Vibrating blade 97 levels off the material on plate 89 as said material travels through passage 99 so that the particulate material cascades in an even flow over discharge end 93 of the plate. The excess material scraped off by blade 97 falls laterally over the side edges of plate 89 downwardly towards hopper 12. If baffle 39 is provided, the chute or plate is located directly above this baffle so that the excess particulate material drops on to baffle 39 which directs it through opening 40 into sleeve 34. This material either drops on to the spiral bottom of passageway 29 or it drops downwardly through the sleeve on to the particulate material which is being directed towards the entrance 30 of the spiral conveyor.

Although chute or plate 89 might be long enough to discharge outside of hopper 12, in the preferred form of the invention, a trough 110 is provided for receiving the particulate material cascading over the outer end of the chute. In this example, trough 110 is in the form of a tube and is adjustably supported at its inner end 111 by clamps 112 which are secured at their upper ends to arm 84, and embrace trough 110 at their lower ends, said clamps being tightened by means of screws 114. A finger 117 projects inwardly from end 111 of trough 110 to the outer end 93 of chute 89 below the level of said chute. Finger 117 preferably tapers substantially to a point 118 at its other end. An index plate 119 is mounted on the top of tubular trough 110 and has graduations 120 on its upper surface registering with the outer edge of the clamp 112 closest to the outer end of arm 84.

It is desirable to provide a support for the outer end of trough 110 which projects beyond the side of hopper 12. In this example, a bracket 125 is mounted on and projects outwardly from hopper 12 beneath trough 110. A resilient pad 126 is mounted on the outer end of bracket 125, said trough 110 resting on this pad. A resilient band 128 extends around bracket 125 and trough 110 to retain the latter in vertical alignment with the bracket, while permitting the trough to move longitudinally. As chute 89 and arm 84 are vibrated longitudinally thereof, as described above, trough 110 also is vibrated in a longitudinal direction since it is connected at its inner end to arm 84, and rests at its outer end on pad 126. Furthermore, band 128 secures the outer end of trough 110 to bracket 125 to thereby prevent said outer end from swinging laterally, and this helps to ensure that said trough and chute 89 are subjected only to longitudinal vibration under the action of the oscillatory and vibratory motion of conveyor 24, rubber bushed bolt 86 permitting this action to take place.

As previously described, the particulate material from hopper 12 travels upwardly along spiral ramp conveyor 24 and is discharged on to chute 89. This particulate material passes in an even layer under blade 97 and cascades in an even flow over the outer end 93 of the chute. Trough 110 is adjusted so that finger 117 lies beneath said outer end of chute 89 and in the cascading particulate material. This gathers some of the material and directs it into trough 110. The amount of material directed into the trough within a given time is regulated by shifting the trough back and forth relative to arm 84 in order to move finger 117 back and forth in the cascading particulate material. As this finger tapers outwardly to its outer end 118, the width of the finger exposed to the cascading material depends upon the setting of trough 110, and this setting is indicated by graduations 120 of index plate 119. It is preferable to mount chute 89 and trough 110 so that they have a slight upward inclination. As a result of this, the particulate material moves along the chute and trough only under the longituidnal vibratory motion which is imparted to them through conveyor 24 and the oscillatory and vibratory mechanism 43. This ensures a very accurate control of the flow of the particulate material out of the dispenser. If the tip 118 only of finger 117 is positioned within the particulate material flowing over the outer edge of chute 89, only a very small amount of material will travel through trough 110 and be dispensed from the apparatus in a given time. On the other hand, if the trough is adjusted so that the inner or wide end of finger 117 is located in the cascading particulate material, a relatively large quantity of material will be dispensed in a given time. A coarse adjustment is obtained by raising or lowering blade 97 relative to chute 89, this being done by bending the blade at joint 104, while fine adjustments are made by shifting trough 110 and finger 117 longitudinally relative to the chute.

The longitudinal vibratory motion imparted to chute 89 and trough 110, the taper of finger 117, and the vibrating levelling blade 97 make it possible to dispense particulate material from the apparatus in a controlled and accurate manner. The specific mechanism 43 provides the necessary oscillatory and vibratory motion for the spiral ramp conveyor, the longitudinal vibratory motion of the chute and trough, and the vibration of blade 97, in a very simple and effectual manner.

I claim:

1. A dispenser for particulate materials comprising a vertical spiral ramp conveyor mounted for vertical and rotational oscillatory movement and having an entrance at the lower end of said conveyor and an outlet at the upper end of the conveyor, means for directing particulate material to said entrance, a discharge chute at the upper end of the ramp conveyor and extending away therefrom and having a portion thereof positioned adjacent the outlet to receive particulate material from the ramp conveyor, means for imparting rapid helical oscillatory motion to the ramp conveyor to direct material upwardly along said conveyor, means operatively connecting the chute to the ramp conveyor causing longitudinal reciprocatory movement thereof while substantially preventing lateral movement thereof to direct the material longitudinally along the chute, said chute having an open outer end, said material cascading over said outer end of the chute in an even flow as a result of the longitudinal reciprocatory movement of said chute.

2. A dispenser as claimed in claim 1 in which said ramp conveyor is enclosed within a vertical sleeve.

3. A dispenser as claimed in claim 1 in which said chute is in the form of a flat plate without confining side walls so that excess material can flow laterally off the plate.

4. A dispenser as claimed in claim 1 including a trough aligned with said chute and extending away therefrom, means adjustably supporting the trough near the chute, a finger on an entrance end of the trough and extending beneath said outer end of the chute to receive particulate material therefrom and to direct said material into the trough.

5. A dispenser as claimed in claim 4 in which said supporting means connects the trough to the chute so as to reciprocate longitudinally therewith.

6. A dispenser as claimed in claim 4 in which said finger narrows in the direction away from the trough.

7. A dispenser as claimed in claim 1 including depth controlling means in the chute comprising a leveller blade extending across and spaced above the chute and subject to vibratory motion relative to the chute, said blade regulating the depth of particulate material passing thereunder to the outer end of the chute.

8. A dispenser as claimed in claim 7 in which the leveller blade is formed of a springy, vibratable material, and one end of said blade is free so as to permit said blade to vibrate under the vibratory motion imparted thereto.

9. A dispenser as claimed in claim 7 in which said leveller blade has an outer end extending substantially normal thereto and fixedly secured to the upper end of the ramp conveyor.

10. A dispenser as claimed in claim 7 in which said leveller blade is formed of springy material and is inclined both transversely and longitudinally of the chute away from said outer end thereof.

11. A dispenser as claimed in claim 1 in which said means for directing particulate material to the conveyor entrance comprises a conical hopper surrounding the ramp conveyor and having a bottom supporting the latter.

12. A dispenser for particulate materials comprising a storage hopper for particulate material, an enclosed vertical spiral ramp conveyor mounted in the hopper for vertical and rotational oscillatory movement relative to the hopper and having an entrance at the lower end of said conveyor and an outlet at the upper end of the conveyors, said entrance communicating with the interior of said hopper and through which particulate material can flow from the hopper into said spiral conveyor, means for imparting rapid helical oscillatory movement to the ramp conveyor, a discharge chute at the upper end of the ramp conveyor and extending substantially tangentially away therefrom over the hopper and having an inner end positioned adjacent the outlet to receive particulate material from the ramp conveyor, means swingably connecting said inner end of the chute to the upper end of the ramp conveyor so that said chute inner end is subjected to said helical oscillatory movement, means connected to the outer end of the chute to prevent lateral movement thereof while permitting longitudinal reciprocatory movement of the chute, said reciprocatory movement of the chute directing the material longitudinally along the chute, said material cascading over the outer end of the chute in an even flow as a result of the longitudinal reciprocatory movement of said chute.

13. A dispenser as claimed in claim 12 including a leveller blade formed of springy material extending across and spaced above the chute, said blade having one end connected to the ramp conveyor so as to be subject to the oscillatory motion thereof and a free opposite end.

14. A dispenser as claimed in claim 13 in which said chute is in the form of a flat plate without confining side walls so that excess material is directed laterally off the plate into the hopper by the leveller blade.

15. A dispenser as claimed in claim 12 in which said means connecting the inner end of the chute to the upper end of the ramp conveyor comprises a bracket fixedly secured to the upper end of the ramp conveyor centrally thereof and radiating therefrom, a supporting arm swingably connected to an outer end of the bracket and extending substantially normal thereto, said chute being positioned below said supporting arm and extending substantially longitudinally thereof, and bracket means suspended from the arm and connected to the chute.

16. A dispenser as claimed in claim 15 including a trough beneath said supporting arm and aligned with the chute and extending away therefrom out of the hopper, clamp means suspended from the supporting arm and releasably gripping the trough to support the latter, said trough being movable longitudinally relative to the chute when released by the clamping means, and a finger on an entrance end of the trough and extending beneath said outer end of the chute to receive particulate material therefrom and to direct said material into the trough.

17. A dispenser as claimed in claim 16 in which said finger narrows in the direction away from the trough.

18. A dispenser as claimed in claim 17 including a leveller blade formed of springy material extending between the supporting arm and the chute and across and spaced above said chute, said blade having one end connected to the ramp conveyor so as to be subject to the oscillatory motion thereof and a free opposite end.

19. A dispenser as claimed in claim 18 in which said chute is in the form of a flat plate without confining walls so that excess material is directed laterally off the plate into the hopper by the leveller blade.

References Cited

UNITED STATES PATENTS

| 2,771,983 | 11/1956 | Carrier | 198—220 |
| 2,744,066 | 5/1956 | Spiess et al. | 198—220 |
| 2,827,157 | 3/1958 | Tsuchiya et al. | 198—220 |
| 3,146,918 | 9/1964 | Williams | 222—199 |

WALTER SOBIN, *Primary Examiner.*

U.S. Cl. X.R.

198—220; 222—385, 413